United States Patent [19]

Zemanek

[11] 4,290,135
[45] Sep. 15, 1981

[54] CIRCUIT ARRANGEMENT FOR RECEIVING DIGITAL INTELLIGENCE SIGNALS IN A DIGITAL SWITCHING CENTER FOR PCM-TIME-DIVISION MULTIPLEX COMMUNICATION NETWORKS

[75] Inventor: Josef Zemanek, Munich, Fed. Rep. of Germany

[73] Assignee: Siemens Aktiengesellschaft, Berlin & Munich, Fed. Rep. of Germany

[21] Appl. No.: 72,093

[22] Filed: Sep. 4, 1979

[30] Foreign Application Priority Data

Sep. 20, 1978 [DE] Fed. Rep. of Germany ....... 2840952

[51] Int. Cl.³ .......................... H04J 3/12; H04J 3/06
[52] U.S. Cl. .................................... 370/110; 370/100; 375/114; 179/18 FA
[58] Field of Search ........................ 370/110, 100, 92; 375/114, 116; 179/18 FA

[56] References Cited

U.S. PATENT DOCUMENTS 3,558,827  1/1971  Lucas et al. .......................... 370/110
3,970,799  7/1976  Colton et al. ....................... 370/110
3,986,120 10/1976  Edström et al. ..................... 370/110

Primary Examiner—Douglas W. Olms
Attorney, Agent, or Firm—Hill, Van Santen, Steadman, Chiara & Simpson

[57] ABSTRACT

A communication circuit arrangement for receiving digital intelligence signals as, for example, in a digital switching center of a PCM-time-division multiplex communication network wherein signals are transmitted on circuits connected to digital subscriber stations and the signals are in the form of intelligence signal blocks having at least one intelligence signal word and including a synchronizing word ahead of the intelligence signal word. So as to compensate for the fluctuating phase relationship occurring in the received signals, the first bit of the intelligent block is determined using a signal evaluation device and a clock pulse signal having a phase which is selected using a clock pulse selection circuit and wherein a synchronous counter is set to zero. The counter generates release signals for a plurality of registers for the individual portions of the intelligence block and a comparator test for the presence of a proper synchronizing word. Depending on the results of this comparison, the adjusting procedures are repeated upon the occurrence of the next block or alternatively the system continues to function with the incoming data.

The determination of the first bit of an intelligence signal block allows the selection of a bit clock pulse sequence in proper phase and allows the setting of the synchronous counter which controls the acceptance of intelligence into the various registers.

6 Claims, 2 Drawing Figures

CIRCUIT ARRANGEMENT FOR RECEIVING DIGITAL INTELLIGENCE SIGNALS IN A DIGITAL SWITCHING CENTER FOR PCM-TIME-DIVISION MULTIPLEX COMMUNICATION NETWORKS

BACKGROUND OF THE INVENTION

1. Field of the Invention

This invention relates in general to a circuit for receiving digital intelligence signals in a digital switching center of a time-division multiplex communication network wherein the signals are transmitted on extension circuits from digital subscriber stations and the signals in the form of an intelligence signal block containing at least one intelligence word and if necessary a signalling word as well as a synchronizing word which precedes the other portions.

The bit pulses of intelligence signals is primarily synchronous with the exchange pulse of the switching center since the clock pulse generators of the individual subscriber stations are synchronized with the exchange pulse. However, because of the varying transit times of the individual extension circuits which can also be subject to different fluctuations and interference the time of reception at the switching center cannot be precisely fixed. Thus, the circuit arrangement for receiving the intelligence signal blocks in the switching center must be able to accept the intelligence signal blocks in proper phase at any time within a specified reception time span. Also, the switching center must release the information for further processing only if the information includes a proper synchronizing word. Also, the circuit arrangement must not incorrectly interpret interferring signals that occur within the reception time span but displaced with respect to the intelligence signal blocks so that such interferring signals are not evaluated.

2. Description of the Prior Art

A proposed circuit arrangement is illustrated in German Patent Application No. P 28 32 589.5 discloses a circuit wherein a code representation of the digital intelligence signals can be distinguished from periods in which no intelligence signals occur on the extension circuit. In this system, a reception control signal can be derived from the intelligence signal blocks received which indicates its position and length.

However, such preconditions are not always given or, respectively, the creation of such conditions requires additional equipment outlay.

SUMMARY OF THE INVENTION

The object of the present invention is to provide a circuit arrangement which solves the problems listed above for the reception of intelligence signal blocks which have a phase relationship and length which cannot be determined in the manner of the prior art devices.

The object of the invention is accomplished with a circuit which utilizes a signal evaluation device which responds to digital signals which can be distinguished from the quiescent condition or idle state and which is not sensitive to digital signals subsequently received or at least for the duration of an intelligence signal block and at least until the beginning of a new intelligence signal block. Also, the system includes a clock pulse selection circuit which derives a plurality of bit pulse sequences from the exchange clock pulse which are of the same frequency but phase displaced and during a synchronizing phase supplies the bit pulse sequence which is in phase with the response time of the signal evaluation device. In addition, a synchronous counter receives the output of the clock pulse selection circuit and has a counting capacity corresponding to the length of the intelligence signal blocks and the counter is reset during the synchronization phase to its zero reading in response to an output from the signal evaluation circuit. A plurality of registers for receiving the different parts of the intelligence signal are controlled by a sequence control which produces accept-release signals for the registers from the output of the counter of the synchronous counter. A comparator monitors the content of the register which receives the synchronizing word and when coincidence occurs retains a synchronous working phase in which the bit pulse sequence selected by means of the clock pulse selection circuit is retained and a zero setting of the synchronous counter is suppressed and the output from the registers for the signalling word and the intelligence signal word are released and in which in case of non-coincidence introduces or respectively retains the synchronizing phase.

Additional developments of the invention relate to operating additions for a fixed reception time length as well as disclosure of the individual components of the inventive circuit.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
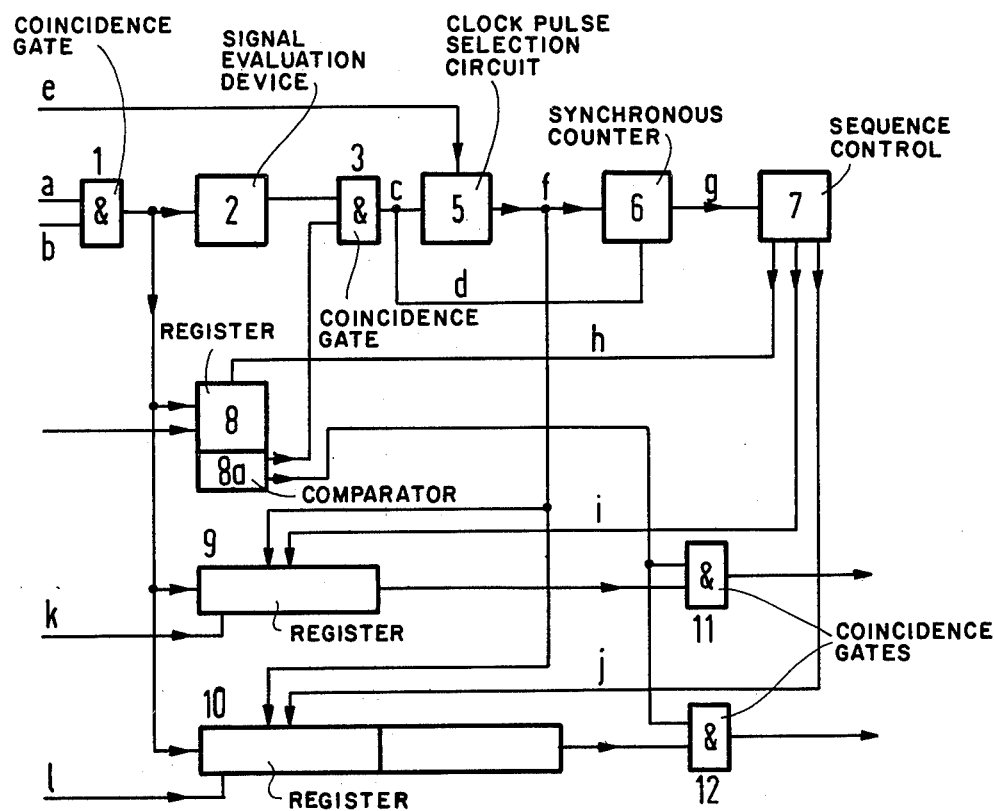
FIG. 1 is a block diagram illustrating the inventive circuit.

FIG. 1 illustrates the invention as arranged for a system wherein the reception time span allows intelligence signal blocks to be received and signals having a greater time span are not acceptable or present. In such systems the so-called time slot separated process, in other words, transmission mode and reception mode are used on the extension circuits in time succession and a pause occurs between the different modes so as to prevent the reception of echo signals.

Figure 2:
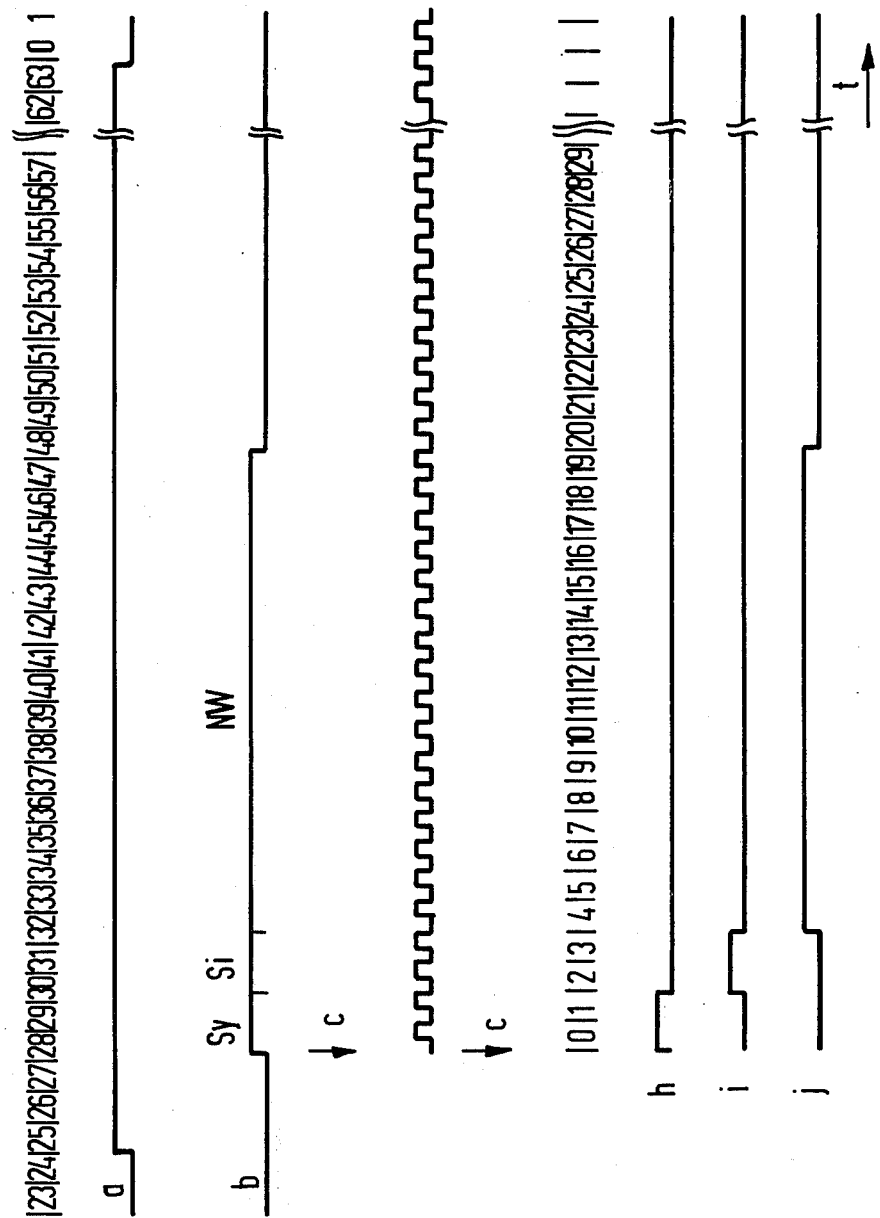
FIGS. 2A through H illustrate signals occurring at various points in the block diagram of FIG. 1.

For this reason, a signal a illustrated in FIG. 2B is received which has a high value so as to indicate the time span and it is linked with the incoming intelligence signals b illustrated in FIG. 2C. The signals a and b are supplied to a coincidence gate circuit 1 which produces an output that is supplied to a signal evaluation device 2 upon coincidence of the signals a and b. The intelligence signals on the incoming line illustrated in FIG. 2C and designated by signal b comprise a synchronizing word Sy, a signalling word Si as well as the actual intelligence signals NW. The signals can be pulse code modulated communication information or any type of data signals which are digitally transmitted. Because of the linkage between the signals a and b, the intelligence signal blocks will arrive only at a signal evaluation device 2 during the reception time span. The signal evaluation device 2 is a type such that it responds to digital signals which are distinguishable from the quiescent or idle condition but is insensitive to such digital signals after the initial response until the beginning of a new intelligence signal block. As stated previously, the synchronizing word Sy which is transmitted ahead of the intelligence signal block begins with a bit value having a value of 1 and the signal evaluation device is constructed so that it responds to such 1 bits and ignores the case of interference bits occuring before the block initiation bit responds to the first bit of an intelligence signal block. In a practical circuit embodiment, the device 2 can be a bistable flip-flop which is set upon the occurrence of the signals a which indicates the beginning of the reception time span as illustrated in FIG. 2B which will be reset with the first 1 bit occurring subsequent thereto.

The output signal from the signal evaluation device is supplied as the input to a coincidence gate 3 which receives a second input from a register 8. During the synchronizing phase, a clock pulse selection circuit 5 is driven by the signal c shown in FIG. 2D. The clock pulse selection circuit 5 generates a series of bit pulses of equal frequencies of, for example, 256 kHz which are phase displaced with respect to one another from the switching clock pulse signal e which for example, would have a frequency of 2.048 MHz. Thus, at the time of the response of the signal evaluation device 2, that clock pulse sequence is selected by means of the control with the signal c and it produces an output pulse sequence f which is in phase.

A synchronous counter 6 has a counting capacity which corresponds to the length of the intelligence signal block receives the selected clock pulse sequence f. During the synchronizing phase, the synchronous counter 6 is reset to its initial counter position, in other words, it is synchronized up to the first signal edge within the reception time span and for this purpose, the output signal d of the coincidence gate 3 is supplied to the counter 6.

The counter 6 produces an output signal g which is supplied to the sequence control 7 which derives accept-release signals for registers 8, 9 and 10.

The sequence control 7 is a decoder which respectively emits output signals h, i and j at appropriate times corresponding to the parts of the intelligence signal blocks and which are respectively the synchronizing word Sy, the signalling word Si and the intelligence signal word NW, during the time that the synchronous counter 6 produces the counter readings corresponding to these words.

The register 8 serves for accepting the synchronizing word, register 9 accepts the signalizing word and register 10 receives the intelligence signal words. Register 9, for example, may have eight register stages and although the signalling word may have only two bits in an intelligence signal block since signalling words comprising eight bits are found by means of over-frame formation. Thus, various bit combinations of the synchronizing word which respectively comprise the bit combination 10 for one time and the bit combination 11 for three times serve for the identification of an overframe. The register 10, for example, can have 16 register stages if an intelligence signal block comprises two PCM words having eight bits each.

When during the reception time span, during a synchronizing phase a proper intelligence signal block arrives, its first bit is recognized by means of the signal evaluation circuit 2 and an equal phase clock pulse is subsequently selected by means of the clock pulse selection circuit 5 which sets the counter 6 to zero. The sequence control 7 then produces an accept-release signal which is supplied to the register 8 so that the synchronous word can be supplied into the register. A comparator 8a is associated with the register 8 and it monitors the contents of the register 8 so as to determine whether a proper synchronous word is contained in the register. Thus, in this system consideration is given to the question as to whether a proper synchronous word can occur both in the code combination 10 as well as in the code combination 11. By way of the sequence control 7 the additional counting of the synchronous counter 6 assures that the following signal word Si and the intelligence signal word NW will arrive respectively in the shift register 9 and the shift register 10.

If the comparison carried out by the comparator 8a indicates that non-coincidence exits, then a signal is emitted at its output which is supplied to one input of the coincidence gate 3 and this signal together with the signal produced by the signal evaluation device 2 fulfills the coincidence condition whereby the synchronization phase is retained and even in the next successive period, the occurrence of the first bit in a reception time span produces a clock pulse selection by means of the clock pulse selection circuit 5 and results in the setting of the synchronous counter 6 to its initial state.

If, on the other hand, a proper synchronous word was contained in register 8 then the signal occurring at the output of the comparison circuit prevents the output signal of the signal evaluation circuit 2 from being supplied to the devices 5 and 6. Therefore, there exists a synchronous working phase in which the bit clock pulse sequence previously selected by the clock pulse selection circuit is retained and a zero setting of the synchronous counter 6 is suppressed until non-coincidence is again determined by means of the comparator 8a.

Thus, in the synchronous operation, interference which occur during a reception time span before and after an intelligence signal block cannot arrive at the registers 8 through 10.

If a positive comparison results is determined by the comparator 8a, a release signal is supplied by the comparator 8a to the coincidence gates 11 and 12 which allow outputs of the shift registers 9 and 10 to pass to utilization devices not illustrated of the switching center which serve for the processing of the digital signals. The time of occurrence of such output is determined by the transfer of signals k and l which are furnished by a suitable clock device.

In the time slots separated process given as example here, the system operates in a discontinuous manner wherein one alternately transmits and receives during fixed spans. In time continuous transmission processes to which the frequency separated slot process in which the transmission of intelligence signals of the two transmission directions occurs which uses two different carrier frequencies and the so-called duplex channel system and in which distinction is not made between transmission mode and reception mode and in which with the use of a bridge circuit assures that the transmitted signals are not received together with the signals from the opposite direction does not provide pauses or gaps in the flow of information which causes the synchronizing word to lose its special position as a clear indication of the beginning of an information block. In this event, one must therefore work with a more complicated synchronizing word which has the characteristics and contains more than two bits and also a more complicated identification procedure must be used such as monitoring the repeated occurrence of the synchronizing word at specific intervals. In a reception circuit according to the invention which can operate with these transmission methods the coincidence gate 1 is not used since a signal defining a reception time span will not be present. Also a plurality of time stepped transfer signals k and 1 must be provided since there is no longer the possibility of identifying these points in time into a reception pause. The selection of the respective proper transfer signals can be accomplished by using a signal supplied by the sequence control.

Although the invention has been described with respect to preferred embodiments, it is not to be so limited as changes and modifications may be made therein which are within the full intended scope as defined by the appended claims.

I claim as my invention:

1. A circuit arrangement for the reception of digital intelligence signals in a digital switching center of a time-division communication network, which signals are transmitted on extension circuits from digital subscriber stations and are in the form of intelligence signal blocks comprising at least one intelligence signal word, and if necessary a signalling word, and a synchronizing word comprising a signal evaluation device (2) which responds to digital signals distinguishable from the quiescent condition and is insensitive to such digital signals subsequent thereto for at least for the duration of an intelligence signal block (Sy, Si, NW) and a maximum time of until the beginning of a new intelligence signal block; a clock pulse selection circuit (5) connected to said signal evaluation device and derives a plurality of bit clock pulse sequences (f) of identical frequency but phase displaced from an exchange clock pulse (e) from the switching center and, during a synchronizing phase only passes said bit clock pulse sequence (f) which is in phase with the signal from the evaluation device (2); a synchronous counter (6) receiving the output of said clock pulse selection circuit and having a counting capacity corresponding to the length of the intelligence signal blocks which are forwarded by means of said bit clock pulse sequence (f) and said counter placed in its initial counter reading stage with a signal from the signal evaluation circuit; at least three registers (8, 9, 10) for the signal parts (Sy, Si, NW) of an intelligence signal block each connected to said incoming intelligence signal blocks and a sequence control (7) connected to said counter and deriving accept-release signals for said three registers (8, 9, 10) from the counter readings of the synchronous counter (6), a comparator (8a) which monitors the contents of one of said three registers which accepts the synchronizing word (Sy) for the occurrence of a synchronizing word and when coincidence occurs, a synchronous working phase results in which said bit clock pulse sequence (f) selected by means of the clock pulse selection circuit is retained and a zero setting of the synchronous counter is suppressed, and in the outputs of said three registers for the signalling word (9) and the intelligence signal word (10) are released, and in the case of non-coincidence, the synchronizing phase results.

2. A circuit arrangement according to claim 1, which accepts intelligence signals (b) only during a fixed reception time period (a).

3. A circuit arrangement according to claim 2, characterized in that the signal evaluation device (2) is a bistable flip-flop which is set at the beginning of each reception time period (a) and is reset by means of the first digital signal of a pre-determined binary value occurring thereafter; and the sequence control (7) is a decoder which respectively emits output signals corresponding to the said portions (Sy, Si, NW) of the intelligence signal blocks as long as the synchronous counter (6) has a counter reading corresponding to these portions.

4. A circuit for receiving block digital signals having the form of a synchronizing word, a signalling word and a message word and wherein said block has a known time length comprising, a first gate receiving said block digital signals and a signal having a duration at least as long as the time length of said block digital signals, three registers receiving the output of said first gate to store a synchronizing word, a signalling word and an intelligence word, respectively, a comparator circuit connected to the one of said three registers in which said synchronizing word is stored, a signal evaluation device receiving the output of said first gate, a second gate receiving inputs from said comparator and said signal evaluation device, a clock pulse selection circuit receiving inputs of the output of said second gate and a switching clock pulse train, a synchronizing counter receiving an input from said clock pulse selection circuit and an input from said second gate, a sequence control receiving an input from said counter and supplying separate inputs to each of said three registers, a third gate connected to a second one of said three registers and receiving an input from said comparator, and a fourth gate connected to a third one of said three registers and receiving an input from said comparator.

5. A circuit according to claim 4 wherein said second one of said three registers receives a first transfer signal.

6. A circuit according to claim 5 wherein said third one of said three registers receives a second transfer signal.

* * * * *